Sept. 8, 1931.　　M. N. LAURSEN　　1,822,352
PLANTER WIRE SCALE
Filed May 12, 1930
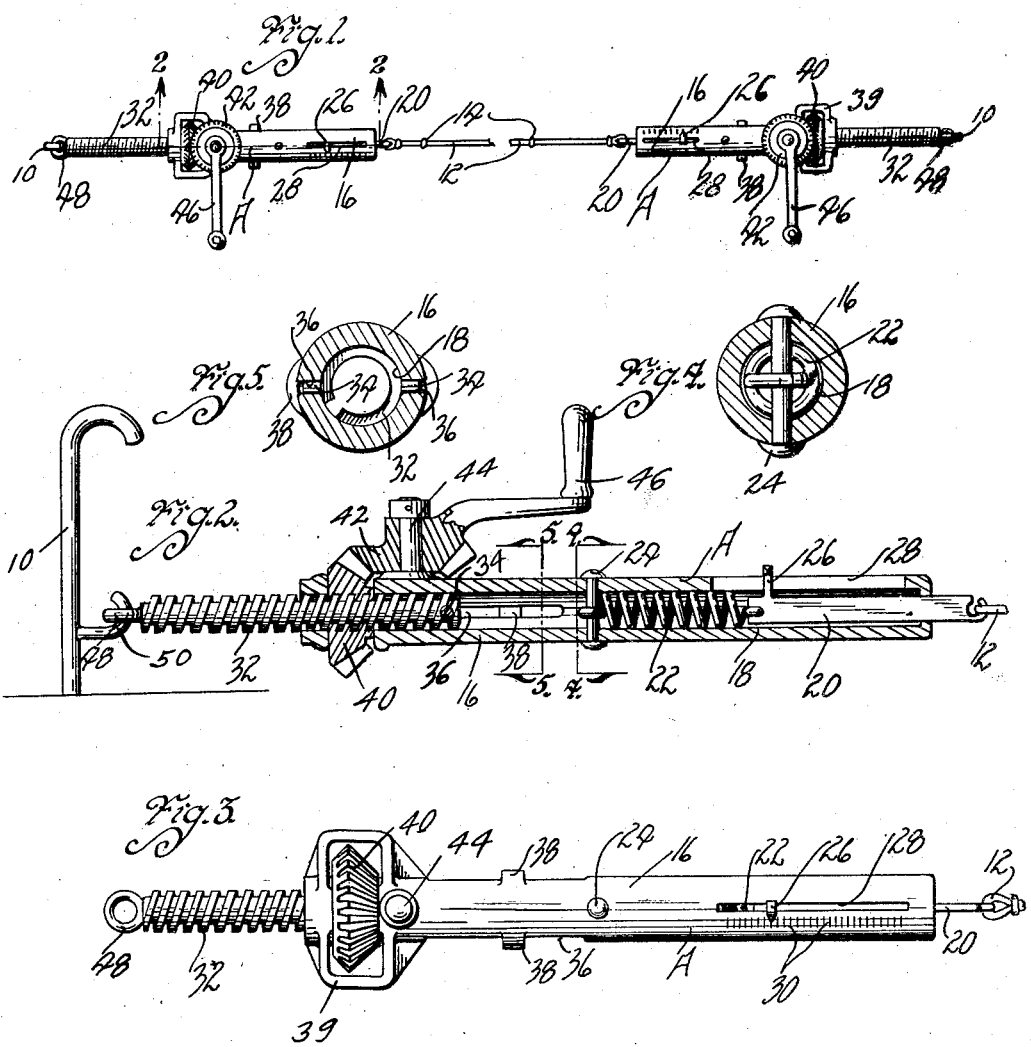

Patented Sept. 8, 1931

1,822,352

UNITED STATES PATENT OFFICE

MARIUS N. LAURSEN, OF O'BRIEN COUNTY, IOWA

PLANTER WIRE SCALE

Application filed May 12, 1930. Serial No. 451,656.

The object of my invention is to provide a planter wire scale which is simple, durable and comparatively inexpensive to manufacture.

A further object of my invention is to provide a scale whereby the tension of a planter wire may be accurately determined.

In this connection it may here be mentioned that in planting corn with a corn planter, a check row wire extends between stakes at the ends of the corn field and is provided with buttons properly spaced and which coact with the mechanism of the corn planter during its travel across the field to drop the grains of corn in properly spaced hills.

The problem has been encountered of keeping the tension of the wire always the same, as the stakes are set first at one end of the field and then at the other.

The necessity for keeping the tension of the wire the same each setting of the stake is due to the fact that unless equal tension is preserved throughout the width of the field, the hills in consecutive rows will be out of alignment and the corn cannot then be cultivated crosswise of the field which is very desirable.

It is, therefore, my object to provide a scale means to accurately determine the tension of the wire and to further provide a convenient and easily operated means for accurately adjusting the planter scale after the stake has been set.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a plan view of a pair of stakes, a pair of planter wire scales embodying my invention and a planter wire having its ends connected with the planter wire scales.

Figure 2 is an enlarged vertical sectional view through one of the planter wire scales showing the construction thereof, and taken on the line 2—2 of Figure 1.

Figure 3 is a partial plan view of one of the scales and

Figures 4 and 5 are sectional views on the lines 4—4 and 5—5 respectively of Figure 2 illustrating cross sectional views of the planter wire scale.

On the accompanying drawings, I have used the reference numeral 10 to indicate a removable stake which may be inserted in the ground at the end of a corn field. The planter wire scale is indicated generally by the reference character A while the planter wire itself is indicated at 12. This trip buttons of the planter wire 12 are indicated at 14.

The planter wire scale A consists of a casing member 16 having a longitudinal bore 18. A scale bar 20 is slidably mounted in the bore 18 and is constrained toward inward movement by a spring 22. The spring 22 is anchored to the casing 16 by means of a rivet or the like 24.

The scale bar 20 is provided with a pointer 26 extending through a slot 28 in the casing 16. The pointer 26 cooperates with indicating marks 30 whereby the tension exerted to pull the scale bar 20 against the action of the spring 22 may be measured.

A screw threaded rod 32 is slidably mounted in the bore 18 and is retained against rotating movement relative thereto by means of a pin 34. The pin 34 travels in slots 36 formed in the sides of the casing 16. Tie bars 38 are provided for reinforcing the casing 16 over the slots 36.

A bevel gear 40 is screw threadedly mounted on the rod 32 and meshes with a bevel gear 42. The bevel gear 42 is mounted on a stub shaft 44 and is provided with a crank 46 for rotating the gear.

The outer end of the rod 32 is provided with a perforated eye 48 adapted to coact with a hook 50 formed on the stake 10.

Practical operation

In the operation of my device, one stake 10 is inserted in the ground at one end of a corn field, one of the scales A is hooked on the hook 50 thereof, the wire 12 is strung lengthwise of the field and attached to the scale A already referred to and to a second one which in turn is hooked to another stake 10 at the opposite end of the field. The crank 46 at the second end of the field is adjusted until the desired tension of the wire 12 is indicated by the pointer 26 and marks 30. A row of corn is then planted whereupon the first stake is reset and adjusted by the crank 46 on the first scale until the reading thereof is the same as the other one. These steps are repeated throughout the width of the field with the result that the hills of corn are accurately aligned crosswise of the field without any guess work.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a planter wire scale, a frame, a telescoping bar mounted therein, scale means to indicate the extension of said bar, a screw threaded rod telescopically mounted in said frame, a bevel gear threaded thereon, a second bevel gear meshing with the first one and a crank for rotating the second bevel gear.

2. In a planter wire scale, a frame, a telescoping bar mounted therein, a spring for pulling the bar inward relative to the frame, a pointer on the bar to indicate the extension of said bar, a screw threaded rod telescopically mounted in said frame, a bevel gear threaded thereon, a second bevel gear meshing with the first one and a crank for rotating the second bevel gear.

3. In a planter wire scale, a frame, a telescoping bar mounted therein, scale means to indicate the extension of said bar, a screw threaded rod telescopically mounted in said frame, a member threaded thereon and means for rotating the member.

4. In a planter wire scale, a tubular casing, a bar slidabe in one end thereof, spring means to pull the bar inward, a rod slidable in the other end of said casing, said rod being threaded, a bevel gear threaded thereon, a second bevel gear meshing therewith and a crank on the second bevel gear.

Des Moines, Iowa, April 29, 1930.

MARIUS N. LAURSEN.